United States Patent
Liu et al.

(10) Patent No.: US 10,915,397 B2
(45) Date of Patent: Feb. 9, 2021

(54) DATA STORAGE METHOD, APPARATUS, AND SYSTEM

(71) Applicant: HUAWEI TECHNOLOGIES CO., LTD., Shenzhen (CN)

(72) Inventors: Xiaowei Liu, Chengdu (CN); Huatao Wu, Chengdu (CN); Lihui Yin, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 11 days.

(21) Appl. No.: 16/382,200

(22) Filed: Apr. 12, 2019

(65) Prior Publication Data
US 2019/0235956 A1    Aug. 1, 2019

Related U.S. Application Data

(63) Continuation of application No. PCT/CN2017/117532, filed on Dec. 20, 2017.

(51) Int. Cl.
*G06F 11/00* (2006.01)
*G08C 25/00* (2006.01)
(Continued)

(52) U.S. Cl.
CPC .......... *G06F 11/1076* (2013.01); *G06F 3/064* (2013.01); *G06F 3/067* (2013.01);
(Continued)

(58) Field of Classification Search
CPC ............. G06F 11/1076; G06F 11/3409; G06F 3/0614; G06F 17/30283; G06F 11/2094;
(Continued)

(56) References Cited

U.S. PATENT DOCUMENTS

2012/0011340 A1*  1/2012  Flynn ................. G06F 12/0246
                                                      711/171
2012/0297154 A1   11/2012  Dematapitiya
                         (Continued)

FOREIGN PATENT DOCUMENTS

CN        103246484 A    8/2013
CN        103631666 A    3/2014
                         (Continued)

*Primary Examiner* — Guerrier Merant
(74) *Attorney, Agent, or Firm* — Kilpatrick Townsend & Stockton LLP

(57) ABSTRACT

A storage client needs to store to-be-written data into a distributed storage system, and storage nodes corresponding to a first data unit assigned for the to-be-written data by a management server are only some nodes in a storage node group. When receiving a status of the first data unit returned by the management server, the storage client may determine quantities of data blocks and parity blocks needing to be generated during EC coding on the to-be-written data. The storage client stores the generated data blocks and parity blocks into some storage nodes designated by the management server in a partition where the first data unit is located. Accordingly, dynamic adjustment of an EC redundancy ratio is implemented, and the management server may exclude some nodes in the partition from a storage range of the to-be-written data based on a requirement, thereby reducing a data storage IO amount.

24 Claims, 8 Drawing Sheets

(51) Int. Cl.
*H03M 13/00* (2006.01)
*H04L 1/00* (2006.01)
*G06F 11/10* (2006.01)
*G06F 9/50* (2006.01)
*G06F 3/06* (2006.01)

(52) U.S. Cl.
CPC .......... *G06F 3/0619* (2013.01); *G06F 3/0644* (2013.01); *G06F 3/0647* (2013.01); *G06F 3/0652* (2013.01); *G06F 9/5061* (2013.01); *G06F 11/1004* (2013.01); *G06F 11/1044* (2013.01)

(58) Field of Classification Search
CPC ......... G06F 2211/1028; G06F 11/1004; G06F 17/30144; G06F 11/1464; G06F 3/0619; G06F 3/064; G06F 3/067; G06F 3/0647; G06F 3/0652; G06F 11/1044; G06F 3/0644; G06F 9/5061; H04L 67/1097; H04L 63/0428; H04L 12/1881; H03M 13/373; H03M 13/1515; H03M 13/35; H03M 13/05
See application file for complete search history.

(56) References Cited

U.S. PATENT DOCUMENTS

| | | |
|---|---|---|
| 2015/0067421 A1 | 3/2015 | Baptist et al. |
| 2016/0246677 A1* | 8/2016 | Sangamkar ............. G06F 3/067 |
| 2016/0357440 A1 | 12/2016 | Wang et al. |
| 2017/0046227 A1* | 2/2017 | Fan ..................... G06F 11/1088 |
| 2017/0206135 A1 | 7/2017 | Zeng |
| 2017/0255522 A1 | 9/2017 | Wang et al. |
| 2019/0196728 A1 | 6/2019 | Feng |

FOREIGN PATENT DOCUMENTS

| | | |
|---|---|---|
| CN | 104932953 A | 9/2015 |
| CN | 105095013 A | 11/2015 |
| CN | 106383665 A | 2/2017 |
| CN | 106406758 A | 2/2017 |
| CN | 107391301 A | 11/2017 |

\* cited by examiner

When all nodes in a partition P are normal:

Data block quantity N=4

Parity block quantity M=2

When a node n3 is faulty:

Data block quantity N=3

Parity block quantity M=2

DATA STORAGE METHOD, APPARATUS, AND SYSTEM

CROSS-REFERENCE TO RELATED APPLICATIONS

This application is a continuation of International Application No. PCT/CN2017/117532, filed on Dec. 20, 2017, which is hereby incorporated by reference in its entirety.

TECHNICAL FIELD

The present disclosure relates to the field of IT technologies, and in particular, to a data storage method, apparatus, and system.

BACKGROUND

In a distributed storage system at the present stage, an erasure coding (EC) technology is used more widely for data storage. A principle of the erasure coding technology is fragmenting data into N data blocks and encoding the N data blocks by using a redundancy algorithm, to generate M parity blocks. The N data blocks and the M parity blocks are referred to as one EC stripe. The data block or the parity block is also referred to as an EC block. Original data can be recovered, provided that a quantity of lost EC blocks is not greater than M. A redundancy ratio of the EC stripe is r=M/N or r=M/(N+M). For example, when N is equal to 4 and M is equal to 2, the EC stripe may be represented as EC 4+2.

To ensure storage reliability, the distributed storage system assigns N+M EC blocks included in each EC stripe to N+M storage nodes for storage, and the N+M storage nodes constitute a storage node group. In this way, even if a node becomes faulty, an EC block stored in the faulty node can be recovered by using data stored in other nodes in the storage node group. It may be understood that the distributed storage system using the EC technology can tolerate faults occurring in M storage nodes at the same time.

When a storage node in the storage node group becomes faulty, a new storage node is added to the storage node group to replace the faulty storage node, and data in the faulty node is recovered at the new storage node. After the faulty node is restored to normal, the data in the new storage node is written back to the restored node. Because the storage node usually stores a relatively large amount of data, migration and backward migration of the data in the faulty node have relatively great impact on performance of the storage system.

SUMMARY

This disclosure describes a data storage method, apparatus, and system, so as to avoid impact of migration and backward migration of data in a faulty node on performance of a distributed storage system.

According to a first aspect, an embodiment of the present invention provides a data storage system, where the data storage system includes a storage client and a distributed storage system, the distributed storage system uses an erasure coding (EC) technology to store data, the distributed storage system includes a management server and a plurality of storage nodes, and a storage node group consisting of N+M storage nodes corresponds to one partition, where N storage nodes are configured to store data blocks, M storage nodes are configured to store parity blocks generated based on the data blocks, and N and M are positive integers greater than 2;

the storage client processes a write request from user equipment, and requests the management server to assign a data unit for to-be-written data; the management server assigns a first data unit in a first partition for the to-be-written data, and returns an identifier of the first data unit and a status of the first data unit to the storage client, where the status of the first data unit indicates storage nodes that the storage client is allowed to use in the first partition, and a quantity of the storage nodes that the storage client is allowed to use is less than N+M; the storage client determines, based on the status of the first data unit, quantities of data blocks and parity blocks that need to be generated, and performs EC coding on the to-be-written data, to generate data blocks and parity blocks corresponding to the to-be-written data, where a sum of quantities of the generated data blocks and parity blocks is equal to the quantity of the storage nodes that the storage client is allowed to use; and the storage client stores, based on a first partition view and the status of the first data unit, the generated data blocks and parity blocks into the storage nodes that the storage client is allowed to use in the first partition, where each node stores one data block or parity block.

The storage client needs to store the to-be-written data into the distributed storage system, and storage nodes corresponding to the first data unit assigned by the management server for the to-be-written data are only some nodes in the storage node group. When receiving the status of the first data unit that is returned by the management server, the storage client may determine the quantities of the data blocks and parity blocks that need to be generated during EC coding on the to-be-written data. The storage client stores the generated data blocks and parity blocks into some storage nodes designated by the management server in a partition in which the first data unit is located. In this way, dynamic adjustment of an EC redundancy ratio is implemented, thereby reducing a quantity of generated EC blocks; and the management server may exclude some nodes in the partition from a storage range of the to-be-written data based on a requirement, thereby reducing an IO data amount. Further, when there is a faulty node in the partition, the management server may actively exclude the faulty node, to avoid a write failure caused when the storage client writes an EC block to the faulty node.

After obtaining the identifier of the first data unit, the storage client determines, based on the identifier of the first data unit, that the partition in which the first data unit is located is the first partition, and after determining that the partition in which the first data unit is located is the first partition, queries a partition table to obtain the first partition view of the first partition.

In a possible implementation, the storage nodes that the storage client is allowed to use are storage nodes that are designated in the first partition by the management server for the storage client and that store the to-be-written data.

Alternatively, in another possible implementation, there is a faulty node in the first partition, the storage nodes that the storage client is allowed to use are non-faulty nodes in the first partition, and the status of the first data unit indicates states of storage nodes included in the first partition when the management server creates the first data unit.

Further, when the storage nodes that the storage client is allowed to use are the non-faulty nodes in the first partition, a quantity of data blocks that need to be generated by the storage client is a value obtained by subtracting a quantity of faulty nodes in the first partition from N.

The management server may monitor states of storage nodes in the distributed storage system, and when there is a faulty node in the first partition, may exclude the faulty node from the storage range of the to-be-written data, thereby reducing the quantities of the generated data blocks and parity blocks. Addition of a new storage node to the first partition to replace the faulty node is avoided, and data in the faulty node does not need to be migrated and backward migrated.

The storage client determines a list of non-faulty storage nodes in the first partition based on the status of the first data unit and the first partition view.

The storage client determines, based on the status of the first data unit, a quantity of the non-faulty storage nodes in the first partition in which the first data unit is located.

In a possible implementation, to ensure data storage persistence, it needs to be ensured that the quantity of the parity blocks remains unchanged. Even if there is a faulty node in a partition, the quantity of the generated parity blocks is not reduced, but only the quantity of the generated data blocks is reduced. In this case, the quantity of the generated data blocks is equal to the value obtained by subtracting the quantity of the faulty nodes in the first partition from N, and the quantity of the generated parity blocks is equal to M. Because the quantity M of the parity blocks remains unchanged, the storage client may subtract M from the quantity of the non-faulty nodes in the first partition, to obtain the quantity of the data blocks that need to be generated. The quantity M of the parity blocks may be preset by a user in the data storage system, or may be determined through negotiation between the storage client and the management server.

In another possible implementation, the quantity of the parity blocks may be reduced when reduction of data storage persistence is allowed. In this case, the management server may add, to a response message returned to the storage client, the quantities of the data blocks and/or parity blocks that need to be generated. When the response message carries only the quantity of the data blocks that need to be generated, the storage client subtracts the quantity of the data blocks that need to be generated from the quantity of the non-faulty nodes in the first partition, to obtain the quantity of the parity blocks that need to be generated. When the response message carries only the quantity of the parity blocks that need to be generated, the storage client subtracts the quantity of the parity blocks that need to be generated from the quantity of the non-faulty nodes in the first partition, to obtain the quantity of the data blocks that need to be generated.

The management server is further configured to record the status of the first data unit.

When performing a read operation, the storage client obtains a status of a second data unit corresponding to to-be-read data, and a second partition view and a second partition status of a second partition in which the second data unit is located, where the status of the second data unit indicates storage nodes that the storage client is allowed to use in the second partition when the management server creates the second data unit, and the second partition status indicates whether storage nodes included in the second partition are faulty currently.

The storage client determines, based on the status of the second data unit, the second partition view, and the second partition status, a list of normal storage nodes storing EC blocks corresponding to the to-be-read data.

The storage client reads, from the determined list of storage nodes, the EC blocks corresponding to the to-be-read data.

Whether the foregoing storage node is faulty currently indicates whether the storage node is a faulty node or a normal node that is not faulty. The second data unit is a data unit assigned for the to-be-read data by the management server when the to-be-read data is written to the distributed storage system. The status of the second data unit indicates storage nodes in the second partition that store EC blocks corresponding to the to-be-read data. The storage client processes a read request initiated by the user equipment, where the read request carries an identifier of a data unit; and the storage client determines, based on the identifier of the data unit, the status of the second data unit in which the to-be-read data is located and the second partition view, and then finds non-faulty storage nodes storing the EC blocks corresponding to the to-be-read data. The foregoing data reading process corresponds to the foregoing data writing process, and a data reading process in a case of partition degradation when there is a faulty node in a partition is implemented. A new storage node does not need to be added to the first partition to replace the faulty node, and data in the faulty node does not need to be migrated and backward migrated either.

The management server is further configured to: determine, based on a quantity of partitions having a faulty node, whether partition degradation is allowed, and if partition degradation is allowed, assign the first data unit for the to-be-written data in the first partition.

In this embodiment of the present invention, partition degradation means that a quantity of storage nodes that are assigned by the management server to the storage client and that store the to-be-written data is less than a quantity (N+M) of nodes included in a partition.

Specifically, the management server determines whether a ratio of the quantity of the partitions having a faulty node to a total quantity of partitions is greater than a preset percentage, and if the ratio is greater than the preset percentage, determines that partition degradation is allowed. The total quantity of partitions is a quantity of partitions included in a DHT ring.

When partition degradation is not allowed, the management server assigns a fourth data unit for the to-be-written data in a fourth partition having no faulty node, and returns an identifier of the fourth data unit to the storage client. When there are a relatively large quantity of partitions having no faulty node, partition degradation is not needed. In this case, the management server may perform a partition redirection operation, and return, to the storage client, an identifier of a data unit assigned in a partition having no faulty node, so as to fully utilize existing storage resources.

In a possible implementation, during partition degradation, it can still be ensured that a ratio of the quantity of the parity blocks to the quantity of the data blocks does not decrease.

A trigger condition for determining, by the management server, that partition degradation is needed may be: when the storage client writes an EC stripe corresponding to the to-be-written data to storage nodes included in a partition in which a data unit assigned by the management server is located, one or more storage nodes become faulty, causing a write failure. Correspondingly, before the storage client requests the management server to assign the data unit for the to-be-written data, the storage client writes, based on an identifier of a third data unit that is returned by the management server, EC blocks generated based on the to-bewritten data to storage nodes included in a third partition in which the third data unit is located; and when a write failure occurs, requests the management server to reassign a data unit.

The management server may return a status of a data unit and a partition view to the storage client; or the management server records a status of a data unit and a partition view in a database, and the storage client reads the status of the data unit and the partition view from the database based on the identifier of the data unit.

In this embodiment of the present invention, the EC redundancy ratio indicates a ratio of the quantity of the parity blocks that need to be generated to the quantity of the data blocks that need to be generated during EC coding. Values of N and M during EC coding may be determined based on the EC redundancy ratio.

The partitions in this embodiment of the present invention belong to a same DHT ring.

According to a second aspect, an embodiment of the present invention provides a storage client, where the storage client is the storage client described in the first aspect and performs a function of the storage client defined in the first aspect.

Specifically, the storage client includes a first sending unit, an obtaining unit, and a processing unit.

The first sending unit is configured to request a management server to assign a data unit for to-be-written data.

The obtaining unit is configured to obtain an identifier of a first data unit, a status of the first data unit, and a first partition view of a first partition that are returned by the management server, where the first data unit is located in the first partition, the first partition view indicates a list of storage nodes included in the first partition, the status of the first data unit indicates storage nodes that the storage client is allowed to use in the first partition, and a quantity of the storage nodes that the storage client is allowed to use is less than N+M.

The processing unit is configured to: determine, based on the status of the first data unit, quantities of data blocks and parity blocks that need to be generated, and perform EC coding on the to-be-written data, to generate data blocks and parity blocks corresponding to the to-be-written data, where a sum of quantities of the generated data blocks and parity blocks is equal to the quantity of the storage nodes that the storage client is allowed to use.

The first sending unit is further configured to store, based on the first partition view and the status of the first data unit, the generated data blocks and parity blocks into the storage nodes that the storage client is allowed to use in the first partition, where each node stores one data block or parity block.

The obtaining unit is further configured to: when the storage client performs a read operation, obtain a status of a second data unit corresponding to to-be-read data, and a second partition view and a second partition status of a second partition in which the second data unit is located, where the status of the second data unit indicates storage nodes that the storage client is allowed to use in the second partition when the management server creates the second data unit, and the second partition status indicates whether storage nodes included in the second partition are faulty currently.

The processing unit is further configured to determine, based on the status of the second data unit, the second partition view, and the second partition status, a list of normal storage nodes storing EC blocks corresponding to the to-be-read data.

The obtaining unit is further configured to read, from the determined list of storage nodes, the EC blocks corresponding to the to-be-read data.

Before the first sending unit requests the management server to assign the data unit for the to-be-written data, the obtaining unit is further configured to obtain an identifier of a third data unit that is returned by the management server;

the first sending unit is further configured to write EC blocks generated based on the to-be-written data to storage nodes included in a third partition in which the third data unit is located; and when a write failure occurs, the first sending unit requests the management server to reassign a data unit.

According to a third aspect, an embodiment of the present invention provides a management server, where the management server is the management server described in the first aspect and performs a function of the management server defined in the first aspect.

The management server includes:

a receiving unit, configured to receive a request that is sent by a storage client and that is used to assign a data unit for to-be-written data;

an assignment unit, configured to assign a first data unit for the to-be-written data in a first partition; and a second sending unit, configured to: return an identifier of the first data unit, a status of the first data unit, and a first partition view of the first partition to the storage client, where the first partition view indicates a list of storage nodes included in the first partition, and the status of the first data unit indicates storage nodes that are determined by the storage client and that the storage client is allowed to use in the first partition; determine quantities of data blocks and parity blocks that need to be generated; perform EC coding on the to-be-written data, to generate data blocks and parity blocks corresponding to the to-be-written data; and store the generated data blocks and parity blocks into the storage nodes that the storage client is allowed to use in the first partition, where a quantity of the storage nodes that the storage client is allowed to use is less than N+M.

According to a fourth aspect, an embodiment of the present invention further provides a method corresponding to the foregoing data storage system, storage client, and management server. The method describes steps performed by the storage client and management server in the foregoing aspects to implement respective functions. Details are not described herein.

According to a fifth aspect, corresponding to the foregoing method, apparatus, and system, an embodiment of the present invention provides a physical server. The physical server has a function of implementing the storage client or the management server defined in the first aspect. The function may be implemented by hardware, or may be implemented by hardware executing corresponding software. The hardware or software includes modules that correspond to the foregoing functions and that are defined in the foregoing apparatuses. Specifically, a structure of the physical server includes a processor, a memory, a system bus, and an input/output interface, and the processor is configured to support functions corresponding to the storage client or the management server in the system. The input/output interface is configured to communicate with other components in the data storage system, and the processor executes an instruction stored in the memory.

According to a sixth aspect, an embodiment of the present invention provides a computer storage medium, configured to store a computer software instruction used by the foregoing storage client, where the instruction includes a program designed to perform the foregoing aspects.

According to a seventh aspect, an embodiment of the present invention provides another computer storage medium, configured to store a computer software instruction used by the foregoing physical server, where the instruction includes a program designed to perform the foregoing aspects.

DESCRIPTION OF EMBODIMENTS

Figure 1:
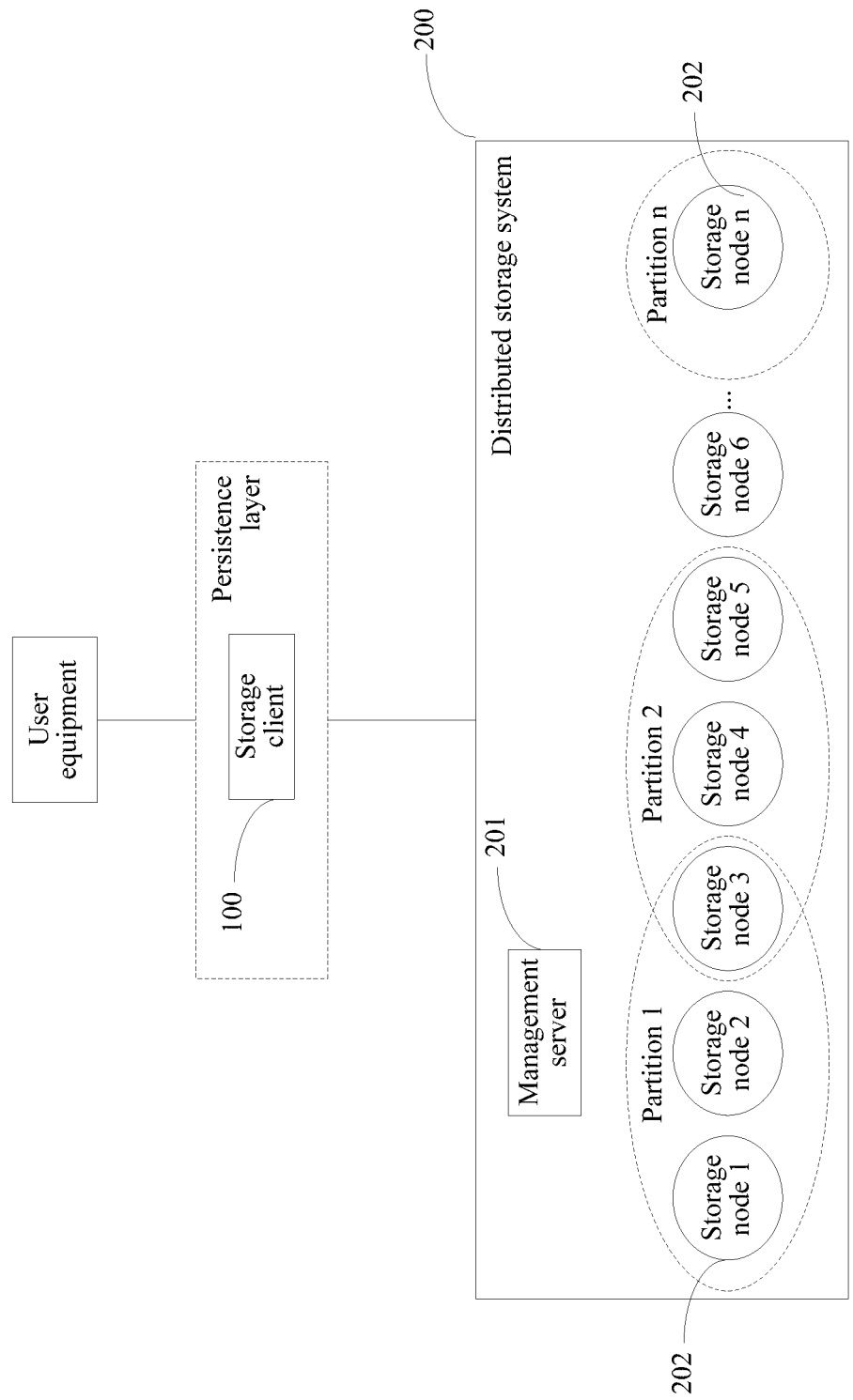
FIG. 1 is a schematic architectural diagram of a data storage system according to an embodiment of the present invention.

FIG. 1 is a schematic architectural diagram of a data storage system according to the present invention. The data storage system includes a storage client 100 and a distributed storage system 200, and the distributed storage system 200 includes a management server 201 and a plurality of storage nodes 202. A user writes, by using the storage client 100 in a persistence layer, data to a storage node included in a partition of the distributed storage system 200. The storage client 100 processes a read/write request from user equipment, and reads data from or writes data to the distributed storage system 200. The storage client generates a plurality of EC blocks from to-be-stored data by using an EC technology, and delivers the EC blocks to a partition of the distributed storage system for storage. Distributed data storage can reduce a data loss risk and improve reliability of the distributed storage system.

The data storage system may use the EC technology to store data. A principle of the EC technology is to fragment to-be-stored data into N data blocks and encode the N data blocks by using a redundancy algorithm, to generate M parity blocks. The N data blocks and the M parity blocks form an EC stripe. Correspondingly, a partition in the distributed storage system may include N+M storage nodes. Each data block or parity block may also be referred to as an EC block, and the N data blocks and the M parity blocks are all EC blocks of each EC stripe. Each EC stripe can tolerate a loss of M EC blocks. When the distributed storage system uses the EC technology to store data, the storage client generates one or more EC stripes based on the to-be-stored data, and delivers N+M EC blocks of each EC stripe to N+M storage nodes in a partition of the distributed storage system for storage. In this way, when a node in the distributed storage system becomes faulty, an EC block stored in the faulty node can be recovered based on an EC block in a non-faulty node. Data of an EC stripe can be successfully read by a data delivery apparatus unless more than M storage nodes of N+M storage nodes storing the EC stripe become faulty. In some embodiments of the present invention, each storage node stores one EC block of an EC stripe. A redundancy ratio is used to represent a contrast between a quantity of parity blocks and a quantity of data blocks in an EC stripe, and may be specifically expressed in various forms, for example, M/N, M/(N+M), or N+M. The form N+M is used as an example in subsequent embodiments of the present invention.

In this example, the distributed storage system includes a plurality of storage nodes. In implementations, N+M storage nodes can constitute a storage node group, and different storage node groups may include a same storage node. Further, the distributed storage system may be divided into a plurality of storage resource pools, the storage resource pools are independent of each other, and storage node groups in different storage resource pools do not include a same storage node.

Figure 2:
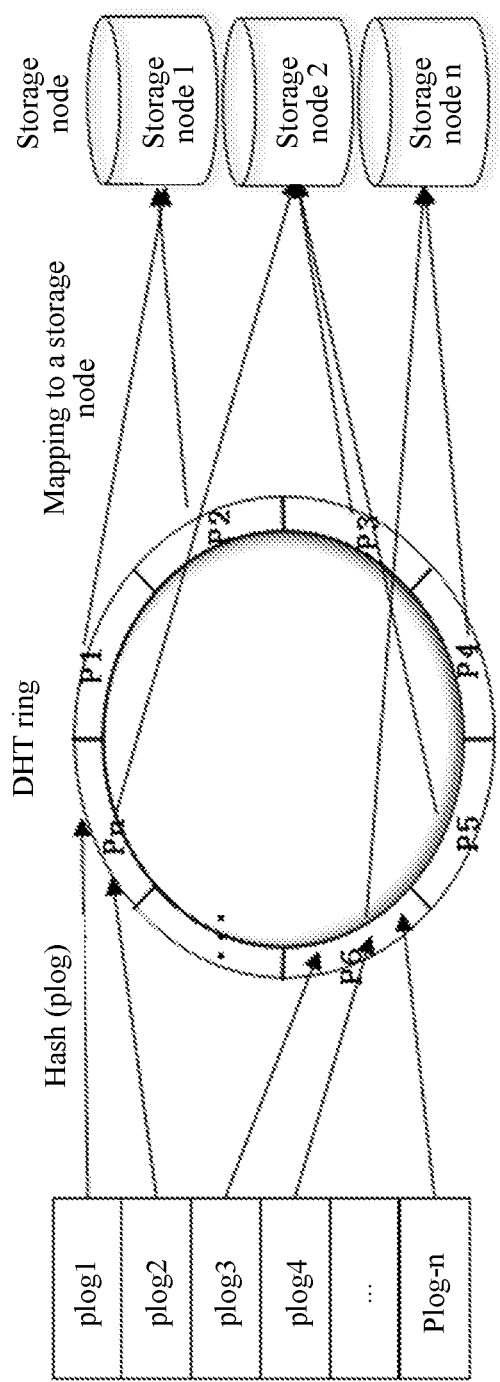
FIG. 2 is a schematic structural diagram of DHT-based distributed data routing in the prior art.

FIG. 2 is a schematic structural diagram of distributed data routing based on a distributed hash table (DHT) in the prior art. One DHT ring corresponds to one storage resource pool. The DHT ring includes a plurality of partitions. Each partition includes N+M storage nodes in the storage resource pool. plog may be referenced as a data unit. Each data unit corresponds to one partition, and each data unit is mapped to a segment of storage space on the storage nodes included in the partition. When the storage client 100 stores to-be-written data, the management server assigns a data unit (plog) for the to-be-written data and sends an identifier of the data unit to the storage client. The storage client calculates a hash value of the identifier of the data unit, determines, based on the calculated hash value, a partition corresponding to the data unit, queries a partition view to determine a list of storage nodes corresponding to the partition, performs EC coding on the to-be-written data, and stores generated EC blocks into storage nodes included in the list of storage nodes. The list of storage nodes is also referred to as a DHT partition table.

Table 1 shows an example of the DHT partition table.

TABLE 1

| Partition ID | Node List |
| --- | --- |
| P0 | Node1, Node2, Node3, Node4, Node5, Node6 |
| P1 | Node2, Node4, Node5, Node7, Node1, Node8 |
| P2 | Node3, Node5, Node6, Node8, Node9, Node10 |
| P3 | Node4, Node6, Node7, Node9, Node10, Node11 |
| ... | ... |
| Pn | Node10, Node1, Node4, Node9, Node6, Node11 |

Each partition in the DHT partition table includes N+M storage nodes, and a redundancy ratio of an EC stripe stored into each partition is r=N+M. Different from the prior art in which each DHT ring has only a constant EC redundancy ratio, an embodiment of the present invention provides a data storage method using a dynamically adjusted EC redundancy ratio, so that an EC redundancy ratio used when the storage client stores the to-be-written data into storage nodes included in each partition of the DHT ring can be dynamically adjusted.

Figure 3:
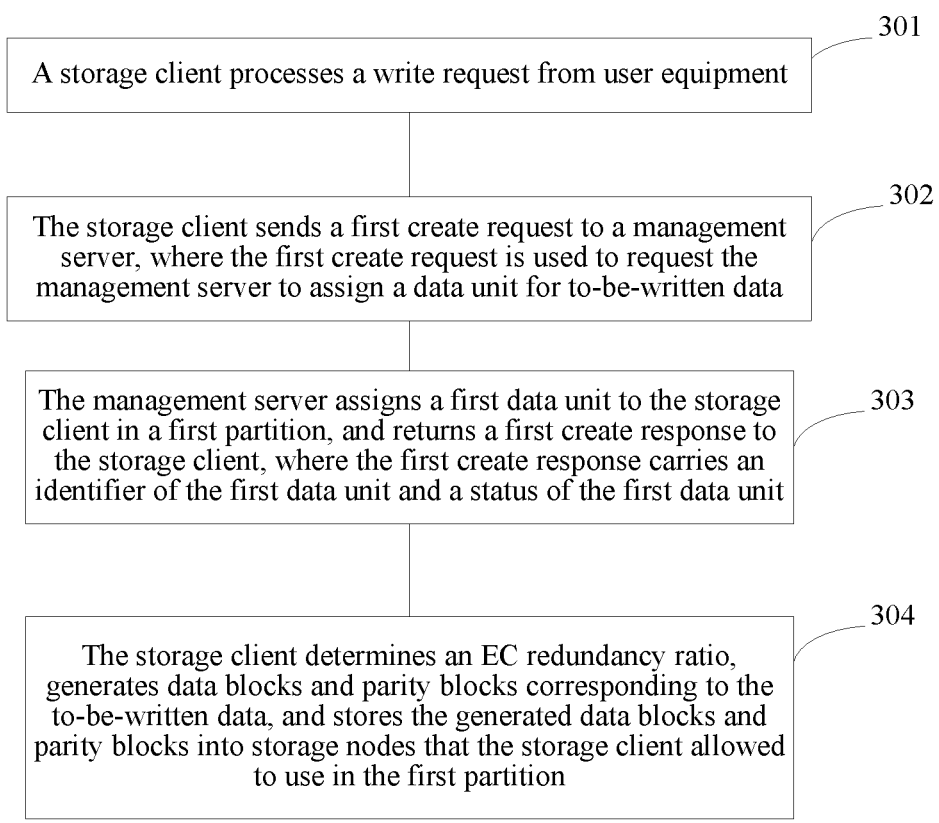
FIG. 3 is a schematic flowchart of a data storage method using a dynamically adjusted EC redundancy ratio according to an embodiment of the present invention.

As shown in FIG. 3, the data storage method using a dynamically adjusted EC redundancy ratio includes the following steps.

Step 301: A storage client processes a write request from user equipment, and performs a write operation on to-be-written data.

Step 302: The storage client sends a first create request to a management server, where the first create request is used to request the management server to assign a data unit for the to-be-written data.

Step 303: The management server assigns a first data unit to the storage client in a first partition, and returns a first create response to the storage client, where the first create response carries an identifier of the first data unit and a status of the first data unit, the status of the first data unit indicates storage nodes that the storage client is allowed to use in the first partition, and a quantity of the storage nodes that the storage client is allowed to use is less than N+M.

The management server may determine, based on a factor such as states of nodes in the first partition or a size of the to-be-written data, a list of storage nodes that the storage client is allowed to use in the first partition.

In a possible implementation, the storage nodes that the storage client is allowed to use are storage nodes that are designated in the first partition by the management server for the storage client and that store the to-be-written data. That is, when the size of the to-be-written data is relatively small, the management server selects only some storage nodes in a partition to provide a storage service for the storage client.

Alternatively, in another possible implementation, there is a faulty node in the first partition, the storage nodes that the storage client is allowed to use are non-faulty nodes in the first partition, and the status of the first data unit indicates states of storage nodes included in the first partition when the management server creates the first data unit. That is, to avoid a write failure, the management server excludes the faulty node in the first partition from a storage range of the to-be-written data.

Both the foregoing two implementations cause an EC redundancy ratio used when the storage client performs EC coding to change, and a sum of quantities of generated data blocks and parity blocks is no longer equal to N+M, but is equal to a quantity of the storage nodes that the storage client is allowed to use.

After determining that partition degradation is needed, the management server notifies, by using the status of the first data unit, the storage client of the storage nodes that the storage client is allowed to use.

Partition degradation means that a quantity of storage nodes that are assigned by the management server to the storage client and that store the to-be-written data is less than a quantity (N+M) of storage nodes included in a partition.

Step 304: The storage client determines an EC redundancy ratio, generates data blocks and parity blocks corresponding to the to-be-written data, and stores the generated data blocks and parity blocks into the storage nodes that the storage client is allowed to use in the first partition.

The storage client obtains the identifier of the first data unit, the status of the first data unit, and a first partition view of the first partition, determines, based on the status of the first data unit, quantities of data blocks and parity blocks that need to be generated, performs EC coding on the to-be-written data, to generate the data blocks and parity blocks corresponding to the to-be-written data, and stores, based on the first partition view and the status of the first data unit, the generated data blocks and parity blocks into the storage nodes that the storage client is allowed to use in the first partition, where each node stores one data block or parity block.

The storage client needs to store the to-be-written data into the distributed storage system, and the storage nodes corresponding to the first data unit assigned by the management server for the to-be-written data are only some nodes in the storage node group. When receiving the status of the first data unit that is returned by the management server, the storage client may determine the quantities of the data blocks and parity blocks that need to be generated during EC coding on the to-be-written data. The storage client stores the generated data blocks and parity blocks into the some storage nodes designated by the management server in the partition in which the first data unit is located. In this way, dynamic adjustment of an EC redundancy ratio is implemented, and the management server may exclude some nodes in a partition from a storage range of the to-be-written data based on a requirement.

It should be noted that the quantities of the data blocks and parity blocks that need to be generated may alternatively be determined by the management server and then notified to the storage client. Specifically, the management server determines, in the first partition, the storage nodes that the storage client is allowed to use, assigns the first data unit for the to-be-written data in the first partition, and returns, to the storage client, the identifier of the first data unit, the status of the first data unit, and the quantities of the data blocks and parity blocks that need to be generated, where the status of the first data unit indicates the storage nodes that the storage client is allowed to use in the first partition, the quantity of the storage nodes that the storage client is allowed to use is less than N+M, and the sum of the quantities of the data blocks and parity blocks that need to be generated is equal to the quantity of the storage nodes that the storage client is allowed to use.

Based on the foregoing data storage system, an embodiment of the present invention provides a data storage method, to read data from or write data to the distributed storage system when there is a faulty storage node.

In a possible implementation, when a storage node in a partition becomes faulty, the to-be-written data is redirected to another available partition through partition redirection.

For example, Table 2 shows an example of a DHT partition table when Node7 is faulty. In this case, partitions P1 and P3 are faulty.

TABLE 2

| Partition ID | Node List |
| --- | --- |
| P0 | Node1, Node2, Node3, Node4, Node5, Node6 |
| P1 (fault) | Node2, Node4, Node5, Node7(fault), Node1, Node8 |
| P2 | Node3, Node5, Node6, Node8, Node9, Node10 |
| P3 (fault) | Node4, Node6, Node7(fault), Node9, Node10, Node11 |
| ... | ... |
| Pn | Node10, Node1, Node4, Node9, Node6, Node11 |

When the storage client writes data to storage nodes included in P1, because Node7 in P1 is faulty, a write failure occurs in an EC block assigned to Node7 for storage, causing a failure of an entire write process. The storage client may request the management server to reassign a data unit, and the management server reassigns a data unit for the to-be-written data in an available partition having no faulty node, so that the storage client writes the data to a storage node included in the available partition.

The management server records partition metadata, the partition metadata includes a partition view and a partition status, the partition view records a list of storage nodes included in a partition, and the partition status records states of the storage nodes in the list of storage nodes.

Figure 4:
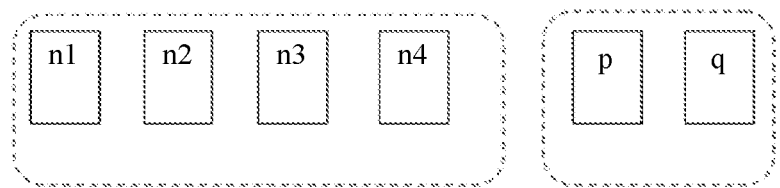
FIG. 4 is a schematic diagram of a partition view according to an embodiment of the present invention.
Figure 4:
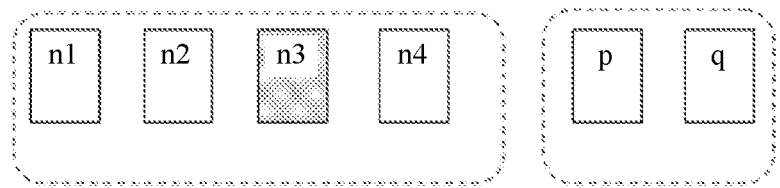

In another possible implementation, in addition to partition redirection, an embodiment of the present invention further provides a data storage method in the distributed storage system using a dynamically adjusted EC redundancy ratio. FIG. 4 is a schematic diagram of a partition view according to an embodiment of the present invention. Description is made by using an example in which N=4 and M=2. In this case, an EC stripe generated based on the to-be-written data needs to include four data blocks and two parity blocks. When six storage nodes in a partition are all normal, four storage nodes (n1 to n4) store data blocks, and two storage nodes (p and q) store parity blocks. When one (for example, n3) of the storage nodes becomes faulty, a quantity of storage nodes storing data blocks is adjusted to 3 (n1, n2, and n4), the storage nodes storing parity blocks remain unchanged. In this case, an EC redundancy ratio N+M is 3+2, and the storage client generates three data blocks and two parity blocks based on the new EC redundancy ratio, and stores the generated five EC blocks into the five normal storage nodes.

In some embodiments, partition metadata of each partition includes a partition view and a partition status, where the partition view is used to identify a list of storage nodes included in the partition, and the partition status is used to identify states of the storage nodes included in the partition. For example, a partition view of a partition P is P={n1, n2, n3, n4, p, q}. When storage nodes in the partition are all normal, a partition status of the partition P is {111111}, where a value "1" indicates that a state of a corresponding storage node is normal, a value "0" indicates that a state of a corresponding storage node is faulty. When the storage node n3 becomes faulty, the quantity of the storage nodes storing data blocks is adjusted to 3. In this case, the partition status is {110111}, where a value of the third attribute is 0, indicating that the storage node n3 is faulty.

When there are a relatively large quantity of faulty nodes, most partitions may include faulty nodes. In this case, a small quantity of partitions having no faulty node are responsible for all data writes, causing unbalanced data storage. In addition, after no free space is left in the small quantity of partitions having no faulty node, a subsequent data write may fail due to lack of storage space. Therefore, in the foregoing dynamic EC adjustment solution, the partitions having a faulty node can be fully utilized in a scenario in which there are a relatively large quantity of faulty nodes. In this case, the management server adds a status of an assigned data unit (that is, states of storage nodes included in a partition in which the data unit is located when the management server creates the data unit) into a response message returned to the storage client, so that the storage client can obtain, based on the status of the data unit, a redundancy ratio of the partition in which the data unit is located (that is, obtain a contrast between quantities of data blocks and parity blocks that need to be generated during EC coding). The storage client performs EC coding on the to-be-written data, to generate data blocks and parity blocks that match non-faulty nodes in the partition in terms of quantity, and stores the generated data blocks and parity blocks into the non-faulty nodes in the partition. In the foregoing manner of partition degradation, the partitions having a faulty node can be fully utilized, and system storage performance is improved.

In a possible implementation, to ensure data storage persistence, it needs to be ensured that the quantity of the parity blocks remains unchanged. Even if there is a faulty node in a partition, the quantity of the generated parity blocks is not reduced, but only the quantity of the generated data blocks is reduced. In this case, the quantity of the generated data blocks is equal to a value obtained by subtracting a quantity of faulty nodes in the first partition from N, and the quantity of the generated parity blocks is equal to M. Because the quantity M of the parity blocks remains unchanged, the storage client may subtract M from a quantity of non-faulty nodes in the first partition, to obtain the quantity of the data blocks that need to be generated. The quantity M of the parity blocks may be preset by a user in the data storage system, or may be determined through negotiation between the storage client and the management server.

In the foregoing manner, when a faulty node occurs in the storage node group, dynamic EC is used for a partition affected by the faulty node, to reduce a quantity of data blocks in an EC stripe and increase a redundancy ratio of the partition. For example, if an EC redundancy ratio N+M is 6+3, when there is one, two, or three faulty nodes in a partition, the redundancy ratio of the partition may be adjusted to 5+3, 4+3, or 3+3.

It should be noted that, when the storage client writes data to the distributed storage system, the management server assigns a data unit for to-be-written data, and returns an identifier of the data unit and a status of the data unit to the storage client. The status of the data unit records states of storage nodes in a partition in which the data unit is located when the management server creates the data unit. After the data unit is created, the status of the data unit is constant and does not vary with a state of a storage node. Description is made by using an example of an EC redundancy ratio of 4+2. When the management server creates a data unit for to-be-written data in the first partition, assuming that a faulty node in the first partition is the third node, a status of the partition is {110111}, and a status of the created data unit is {110111}. When the management server creates another data unit for another piece of to-be-written data in the first partition, assuming that the third node in the first partition is recovered from a fault and the fourth node becomes faulty, a status of the first partition is {111011}, and a status of the another data unit is {110111}. Therefore, it can be learned that a partition status of a same partition may vary with a state of a node included in the partition, but a status of a data unit is a status of the partition at a moment of creating the data unit and does not change.

In addition, if a storage node storing a parity block becomes faulty, the storage node storing a parity block may be replaced with a storage node storing a data block, so that the quantity of the storage nodes storing data blocks is reduced, and the quantity of the storage nodes storing parity blocks remains unchanged. Description is made by using an example of an EC redundancy ratio of 4+2. If a node p storing a parity block becomes faulty, the quantity of the storage nodes storing parity blocks may remain unchanged, and the quantity of the nodes storing data blocks is reduced by 1. In this case, the partition view of the partition P is updated to {1, 2, 3, p, 0, q}, and a corresponding partition status is {111101}.

In a possible implementation, for a partition having a faulty node, the quantity of the parity blocks may be reduced when reduction of data storage persistence is allowed. In this case, the management server may add, to the response message returned to the storage client, the quantities of the data blocks and/or parity blocks that need to be generated. When the response message carries only the quantity of the data blocks that need to be generated, the storage client subtracts the quantity of the data blocks that need to be generated from the quantity of the non-faulty nodes in the second partition, to obtain the quantity of the parity blocks that need to be generated. When the response message carries only the quantity of the parity blocks that need to be generated, the storage client subtracts the quantity of the parity blocks that need to be generated from the quantity of the non-faulty nodes in the second partition, to obtain the quantity of the data blocks that need to be generated.

When there is no faulty node in a partition, the storage client may read or write data in a manner in the prior art. The storage client determines, by calculating a hash value of the identifier of the data unit, a partition in which the data unit is located, and reads data from or writes data to storage nodes included in the partition. When there is a faulty node in a partition, after determining the partition, the storage client reads data from or writes data to a normal storage node in the partition based on the status of the data unit. In this way, not only high performance of partition calculation can be maintained, but also data can be flexibly read or written based on a status of a data unit when a fault occurs, thereby improving availability of the distributed storage system.

Partition redirection and dynamic EC redundancy ratio adjustment may be used separately or may be used in combination. To be specific, partition redirection may be preferentially used, and when a plurality of storage nodes become faulty, the management server dynamically adjusts an EC redundancy ratio after determining, based on a quantity of available partitions, that partition degradation is allowed. When a ratio of the quantity of partitions having a faulty node to a total quantity of partitions is greater than a preset percentage, it is determined that partition degradation is allowed. The preset percentage may be flexibly configured by an administrator. For example, when the quantity of the partitions having a faulty node exceeds 90% of the total quantity of partitions, partition degradation is allowed.

The implementations of the present invention are described in detail below with reference to specific method procedures.

Figure 5:
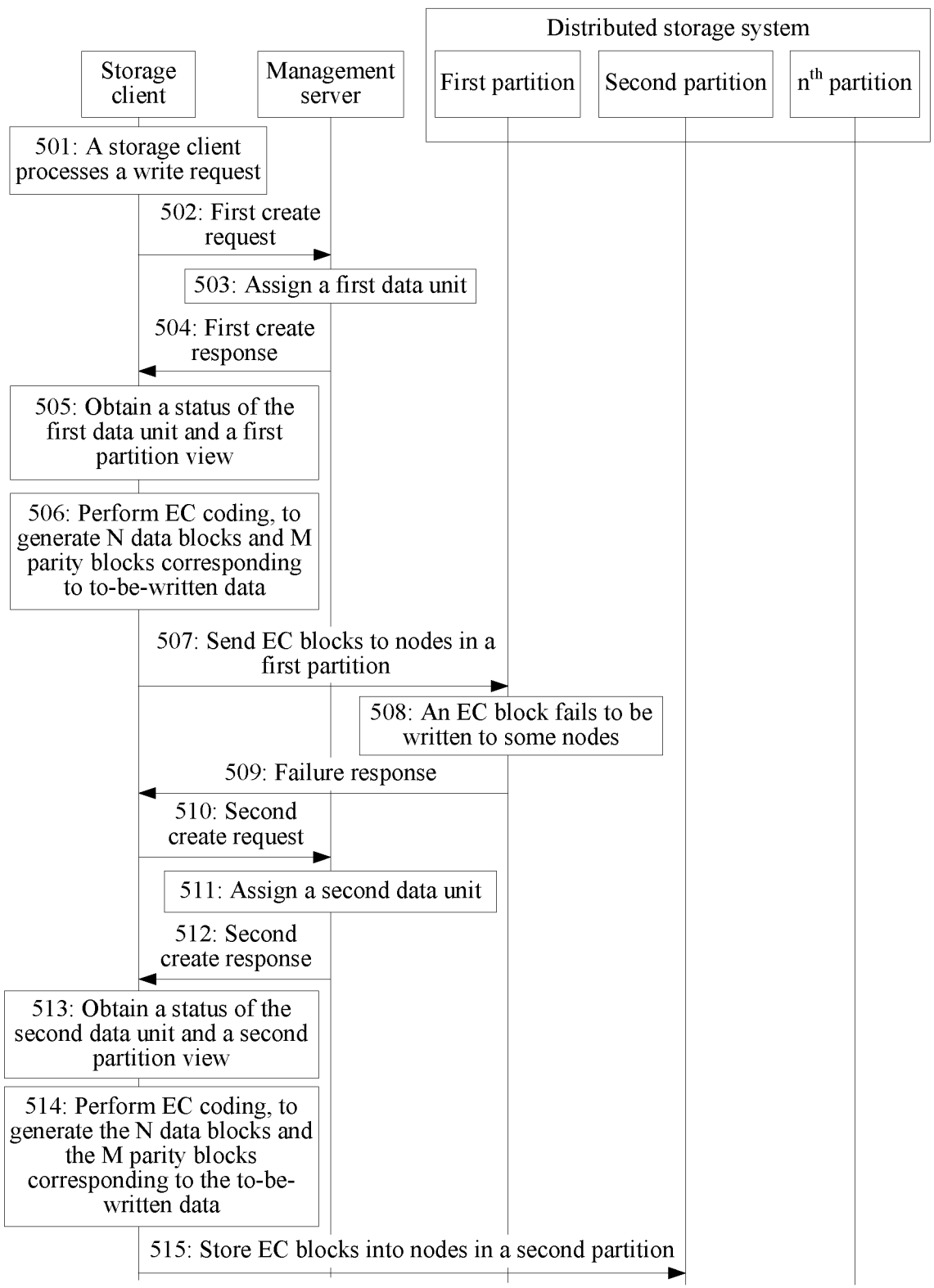
FIG. 5 is a schematic flowchart of a data storage method according to an embodiment of the present invention.

With reference to the schematic structural diagram of the system shown in FIG. 1, FIG. 5 is a schematic flowchart of a data storage method according to an embodiment of the present invention. Based on a partition redirection technology, the method includes the following steps.

Step 501: A storage client processes a write request from user equipment, and performs a write operation on to-be-written data.

Step 502: The storage client sends a first create request to a management server, where the first create request is used to request the management server to assign a data unit for the to-be-written data.

Step 503: The management server assigns a first data unit to the storage client in an available partition.

The management server records states of all storage nodes in a distributed storage system, and therefore can determine a status of each partition based on the states of the storage nodes. The management server assigns a data unit for the to-be-written data in an appropriate partition based on a status of a partition, data balance between partitions, and available space of a storage node. A specific assignment method is not limited in this embodiment of the present invention.

For example, a DHT ring includes 10 partitions, and the management server chooses to assign a data unit in an $x^{th}$ partition. In this case, an identifier of the assigned data unit is 10*n+x, where n is a positive integer. To be specific, when the management server chooses to assign a data unit in the second partition, an identifier of the assigned data unit is 12, 22, 32, or the like. After the storage client obtains the identifier of the data unit, a remainder of 2 may be obtained through the identifier modulo 10, and it can be determined that a partition in which the data unit is located is the second partition.

Step 504: The management server returns a first create response to the storage client, where the first create response carries an identifier (plog ID) of the first data unit.

Step 505: The storage client receives the first create response, and determines, based on the identifier of the first data unit, a first partition storing the to-be-written data, and the storage client obtains a status of the first data unit and a first partition view. For example, P1 in the foregoing Table 1 is used as an example for description. In this case, a partition view of the partition P1 is {Node2, Node4, Node5, Node7, Node1, Node8}, a partition status is {111111}, and the status of the first data unit is {111111}.

For example, the storage client may calculate a hash value of the identifier of the first data unit and obtain a first partition corresponding to the hash value; or the storage client determines, based on a remainder obtained through the identifier of the first data unit modulo a partition quantity, the first partition in which the first data unit is located.

In some embodiments, the storage client may actively obtain the status of the first data unit and the first partition view from the management server or a database, or may passively receive the status of the first data unit and the first partition view that are added to the first create response by the management server.

After creating the first data unit and recording the identifier of the first data unit, the management server records the status of the first data unit.

Step 506: The storage client performs EC coding on the to-be-written data, to generate N data blocks and M parity blocks corresponding to the to-be-written data.

In a possible implementation, N and M may be agreed values. In another possible implementation, the management server may add a value of M to a first create response, and then the storage client may subtract the value of M from a quantity of ones included in the status of the first data unit, and use an obtained remainder as a value of N. After determining values of N and M, the storage client may perform EC coding on the to-be-written data, to obtain the N data blocks and the M parity blocks.

Step 507: The storage client sends the generated data blocks and parity blocks to storage nodes in the first partition.

The storage client may send all the data blocks and parity blocks to a master node in a storage node group corresponding to the first partition, and the master node delivers one EC block to each storage node. Alternatively, the storage client may directly deliver one EC block to each storage node in the storage node group.

Step 508: In a process of writing a data block or parity block to a storage node in a node group of the first partition, a storage node becomes faulty, causing a failure in writing an EC block.

When an EC block fails to be written to any storage node, it indicates that the storage client fails to write the to-be-written data.

Step 509: When data fails to be written, the storage client receives a failure response from the storage node group corresponding to the first partition.

In a possible implementation, the failure response may be sent by the master node in the storage node group.

Step 510: The storage client sends a second create request to the management server, where the second create request is used to request the management server to reassign a data unit for the to-be-written data.

In some embodiments, the second create request may carry an identifier of the first partition in which a write failure occurs, so that the management server obtains an identifier of a partition having a faulty node. Alternatively, the management server may perceive a state of a storage node in real time, and therefore when reassigning the data unit, the management server may select another partition having no faulty node.

Step 511: The management server receives the second create request, assigns a second partition for the to-be-written data, and assigns a second data unit in the second partition.

After creating the second data unit and recording an identifier of the second data unit, the management server records a status of the second data unit.

Step 512: The management server returns a second create response to the storage client, where the second create response carries an identifier of the second data unit.

Step 513: The storage client receives the second create response, and determines an identifier of the second partition based on the identifier of the second data unit, and the storage client obtains a status of the second data unit and a second partition view.

For example, P2 in the foregoing Table 1 is used as an example for description. In this case, a partition view of the partition P2 is {Node3, Node5, Node6, Node8, Node9, Node10}, a partition status of the partition P2 is {111111}, and the status of the second data unit is {111111}.

Step 514: The storage client performs EC coding on the to-be-written data, to generate data blocks and parity blocks corresponding to the to-be-written data.

Optionally, instead of performing step 514, the storage client may use a calculation result in step 506.

Step 515: The storage client stores the data blocks and parity blocks corresponding to the to-be-written data into storage nodes included in the second partition.

It should be noted that the embodiment corresponding to FIG. 5 provides a method in which the management server redirects the to-be-written data to another partition when a write failure occurs. When a partition is not degraded, all N+M nodes in a partition assigned to the storage client by the management server are normal nodes. Therefore, in the embodiment corresponding to FIG. 5, a state of a data unit may not be used (because all the N+M nodes in the partition are normal nodes, the status of the data unit assigned by the management server certainly indicates that all the N+M nodes are normal), and the storage client either does not need to determine quantities of data blocks and parity blocks that need to be generated. Because the partition is not degraded, the quantity of data blocks is certainly N, and the quantity of parity blocks is certainly M.

Figure 6:
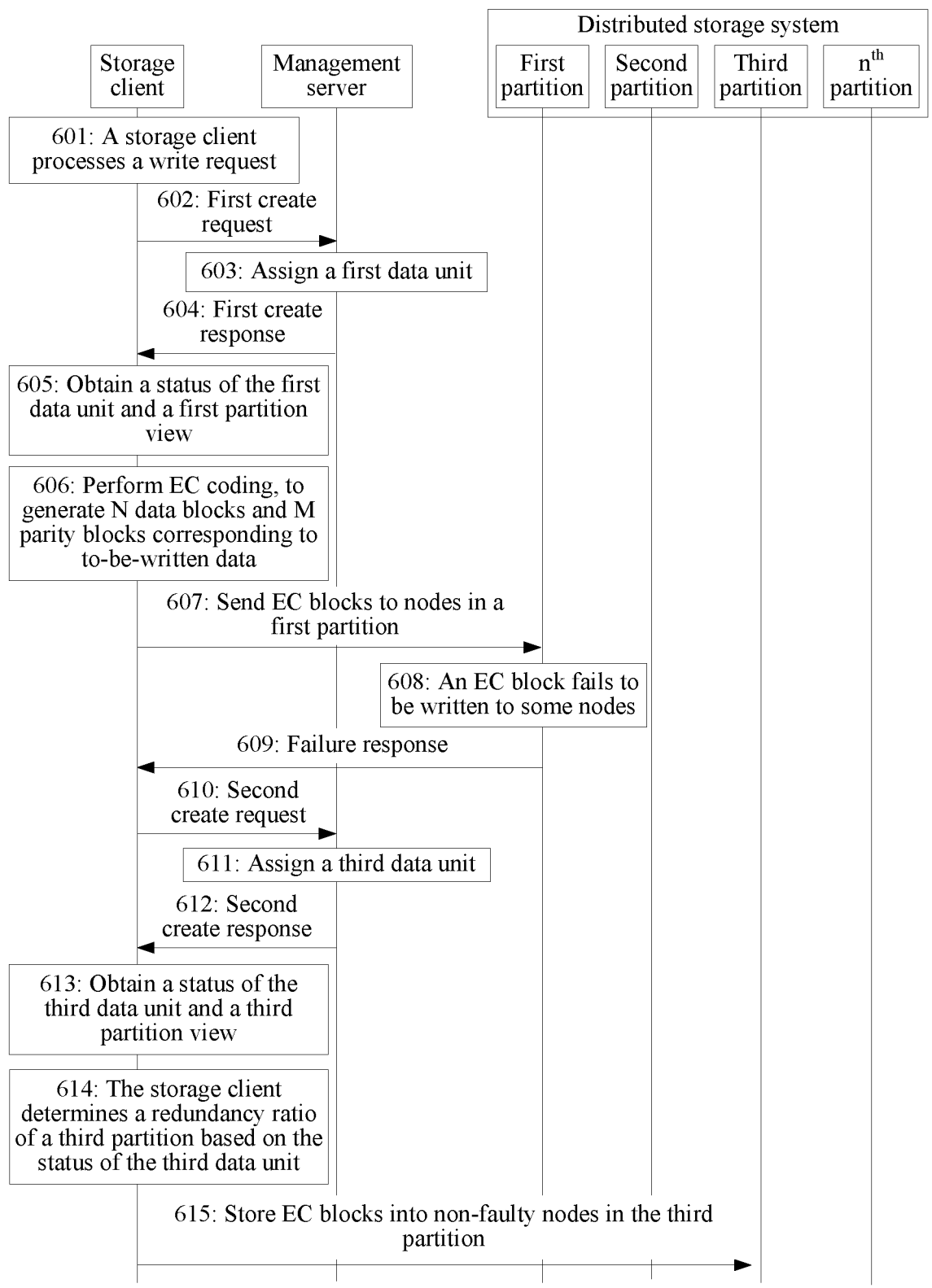
FIG. 6 is a schematic flowchart of another data storage method according to an embodiment of the present invention.

FIG. 6 is a schematic flowchart of another data storage method according to an embodiment of the present invention. An EC redundancy ratio is dynamically adjusted in a data storage process. The method includes the following steps.

Steps 601 to 610 are the same as steps 501 to 510, and details are not described in this embodiment of the present invention again.

Step 611: A management server receives a second create request, and assigns a third data unit for to-be-written data in a third partition, where there is a faulty node in storage nodes included in the third partition.

The management server determines, based on a quantity of available partitions, whether partition degradation is allowed, and when partition degradation is allowed, assigns a data unit for the to-be-written data in the third partition that includes a faulty node.

For example, when the third storage node in the first partition becomes faulty, an updated status of the first partition is {110111}, and a status of the third data unit is {110111}.

After creating the third data unit, the management server records the status of the third data unit.

Step 612: The management server returns a second create response to the storage client, where the second create response carries an identifier of the third data unit. Optionally, the second create response may further carry the status of the third data unit and/or a third partition view.

Step 613: The storage client receives the second create response, and determines, based on the identifier of the third data unit, the third partition in which the third data unit is located, and the storage client obtains the status of the third data unit and the third partition view, and determines a list of non-faulty nodes in the third partition based on the status of the third data unit and the third partition view.

For example, Pn in the foregoing Table 1 is used as an example for description. In this case, a partition view of the partition Pn is {Node10, Node1, Node4, Node9, Node6, Node11}. Assuming that Node4 in the partition Pn becomes faulty, a status of the third partition is {110111}, the status of the third data unit is {110111}, and non-faulty nodes include Node10, Node1, Node9, Node6, and Node11.

Step 614: The storage client determines a redundancy ratio of the third partition based on the status of the third data unit, and performs EC coding on the to-be-written data, to generate data blocks and parity blocks corresponding to the to-be-written data.

In a possible implementation, to ensure data storage persistence, it needs to be ensured that the quantity of the parity blocks remains unchanged. Even if there is a faulty node in a partition, the quantity of the generated parity blocks is not reduced, but only the quantity of the generated data blocks is reduced. In this case, the quantity of the generated data blocks is equal to a value obtained by subtracting a quantity of faulty nodes in a third partition from N, and the quantity of the generated parity blocks is equal to M. Because the quantity M of the parity blocks remains unchanged, the storage client may subtract M from a quantity of non-faulty nodes in the third partition, to obtain the quantity of the data blocks that need to be generated. The quantity M of the parity blocks may be preset by a user in the data storage system, or may be determined through negotiation between the storage client and the management server.

For example, the quantity M of the parity blocks that need to be generated is 2 and remains unchanged. Because Node4 becomes faulty, the quantity of the data blocks that need to be generated is a value obtained by subtracting the quantity (2) of parity blocks from the quantity (5) of non-faulty nodes, and the quantity of the data blocks that need to be generated is 3. Therefore, it is determined that N=3 and M=2. The storage client performs EC coding on the to-be-written data, to generate three data blocks and two parity blocks.

Step 615: The storage client stores the data blocks and parity blocks corresponding to the to-be-written data into non-faulty storage nodes in the third partition, where each storage node stores one EC block.

The storage client sends the generated three data blocks and two parity blocks to the non-faulty nodes in the third partition.

After step 511 or step 611, the foregoing embodiments in FIG. 5 and FIG. 6 further include: determining, by the management server, that there is a faulty node in the first partition, and updating a partition status of the first partition.

When the storage client writes data to the distributed storage system, the management server may assign the first data unit for the to-be-written data in the first partition having a faulty node, and notify the storage client of the identifier of the first data unit and the status of the first data unit. The storage client determines the redundancy ratio (quantities of data blocks and parity blocks that need to be generated) of the first partition based on the status of the first data unit, performs EC coding on the to-be-written data to generate the data blocks and parity blocks, and sends the generated data blocks and parity blocks to the non-faulty nodes in the second partition for storage. According to the foregoing manner, when there is a faulty node in a partition, the management server may perform partition degradation, and notify the storage client of a status of a data unit assigned in the partition, so that the storage client obtains a redundancy ratio of the second partition having a faulty node, reduces the quantity of the generated data blocks based on the determined redundancy ratio of the second partition, and stores the to-be-written data into the non-faulty nodes in the second partition. The faulty node is excluded from a data storage range, and migration of data in the faulty node to a new storage node to replace the faulty node is avoided, thereby reducing impact of a node fault on read and write performance of the storage system.

In the foregoing process, the management server notifies the storage client of the status of the first data unit, and the storage client may determine, based on the status of the first data unit, a list of non-faulty nodes in the first partition and the quantities of the data blocks and parity blocks that need to be generated.

A trigger condition for determining, by the management server, that partition degradation is needed may be: when the storage client writes an EC stripe corresponding to the to-be-written data to storage nodes included in a partition in which a data unit assigned by the management server is located, one or more storage nodes become faulty, causing a write failure. Before the management server determines that partition degradation is needed, the storage client obtains, from the management server, an identifier of the second data unit assigned for the to-be-written data. When a storage node in the second partition in which the second data unit is located becomes faulty, the storage client fails to write data to the second partition.

It should be noted that, during partition degradation, if the storage client still fails to write data, the management server may further assign another partition for the to-be-written data. The another partition may be a degraded partition, that is, nodes that the storage client is allowed to use in the another partition are some nodes in the another partition. The management server notifies the storage client of a status of a data unit assigned in the another partition.

In the embodiments of the present invention, different partitions in a same embodiment all belong to a same DHT ring.

Figure 7:
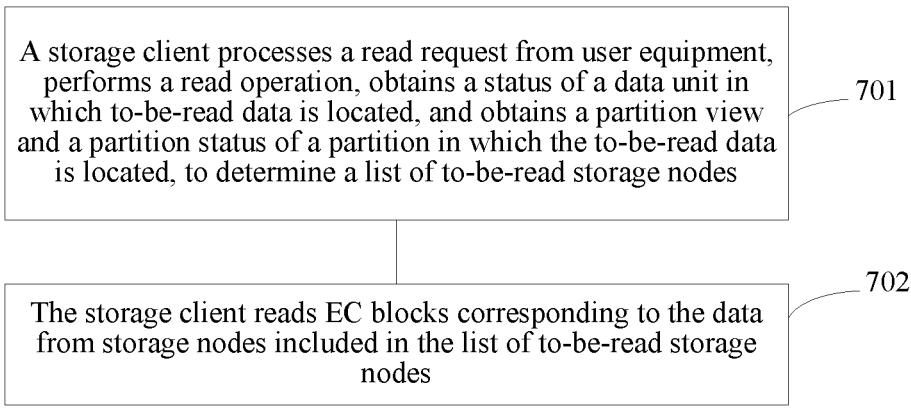
FIG. 7 is a schematic flowchart of data reading according to an embodiment of the present invention.

FIG. 7 is a schematic flowchart of data reading according to an embodiment of the present invention, including the following steps.

Step 701: A storage client processes a read request from user equipment, performs a read operation, obtains a status of a data unit in which to-be-read data is located, and obtains a partition view and a partition status of a partition in which the to-be-read data is located, to determine a list of to-be-read storage nodes.

For example, that N=4, M=2, a status of the data unit is {110111}, a partition status is {111011}, and a partition view is {Node4, Node6, Node7, Node9, Node10, Node11} is used as an example for description. The status of the data unit {110111} indicates storage nodes that the storage client is allowed to use in a second partition when a management server creates the second data unit, the status of the data unit {110111} indicates that the management server allows the storage client to use the first, second, fourth, fifth, and sixth storage nodes and the use of the third storage node is not allowed (the third storage node may be faulty). The partition status {111011} indicates that the fourth storage node included in a current partition is faulty and other storage nodes are normal. The storage client determines, based on the status of the data unit and the partition status, that nodes storing EC blocks corresponding to the to-be-read data are the first, second, fifth, and sixth storage nodes, and with reference to the partition view, may determine that the storage nodes storing the EC blocks corresponding to the to-be-read data are Node4, Node6, Node10, and Node11.

Step 702: The storage client reads EC blocks corresponding to the data from storage nodes included in the list of to-be-read storage nodes.

The storage client may determine, in a manner described in the prior art, the data unit in which the to-be-read data is located. This is not limited in this embodiment of the present invention. For example, the read request carries an identifier of the data unit in which the to-be-read data is located. When the read request does not carry an identifier of a data unit, the storage client may search for metadata of the data unit based on a volume identifier and a read length carried in the read request, and determine, based on the volume identifier and the read length, an identifier of a data unit corresponding to the to-be-read data.

It should be noted that after the list of storage nodes in which the EC blocks corresponding to the to-be-read data are located is found, a storage location of a corresponding EC block may be found from the list by using a common technical means in the art. For example, the storage client sends a read request to a storage node, where the read request carries a start address and a read length; and the storage node may read an EC block based on the start address and a read length According to the embodiment described in FIG. 7, if data is written in a manner of partition degradation, when reading the data, the storage client may obtain a status of a data unit to which the data is written, so as to determine a list of storage nodes to which the data is written; and then may determine, with reference to a list of currently normal storage nodes, a list of storage nodes storing the EC blocks corresponding to the to-be-read data, thereby completing a data reading process.

Figure 8:
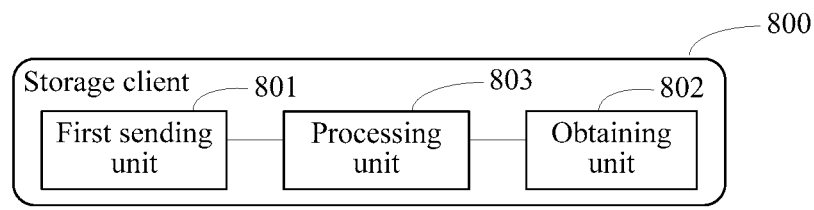
FIG. 8 is a schematic structural diagram of a storage client according to an embodiment of the present invention.

FIG. 8 is a schematic structural diagram of a storage client 800 according to an embodiment of the present invention. The storage client 800 is the storage client in the foregoing embodiments and performs a function of the storage client in the foregoing embodiments.

In some embodiments, the storage client 800 includes a first sending unit 801, an obtaining unit 802, and a processing unit 803.

The first sending unit 801 is configured to request a management server to assign a data unit for to-be-written data.

The obtaining unit 802 is configured to obtain an identifier of a first data unit, a status of the first data unit, and a first partition view of a first partition that are returned by the management server, where the first data unit is located in the first partition, the first partition view indicates a list of storage nodes included in the first partition, the status of the first data unit indicates storage nodes that the storage client is allowed to use in the first partition, and a quantity of the storage nodes that the storage client is allowed to use is less than N+M.

The processing unit 803 is configured to: determine, based on the status of the first data unit, quantities of data blocks and parity blocks that need to be generated, and perform EC coding on the to-be-written data, to generate data blocks and parity blocks corresponding to the to-be-written data, where a sum of the generated data blocks and parity blocks is equal to the quantity of the storage nodes that the storage client is allowed to use.

The first sending unit 801 is further configured to store, based on the first partition view and the status of the first data unit, the generated data blocks and parity blocks into the storage nodes that the storage client is allowed to use in the first partition, where each node stores one data block or parity block.

The obtaining unit 802 is further configured to: when the storage client performs a read operation, obtain a status of a second data unit corresponding to to-be-read data, and a second partition view and a second partition status of a second partition in which the second data unit is located, where the status of the second data unit indicates storage nodes that the storage client is allowed to use in the second partition when the management server creates the second data unit, and the second partition status indicates whether storage nodes included in the second partition are faulty currently.

The processing unit 803 is further configured to determine, based on the status of the second data unit, the second partition view, and the second partition status, a list of normal storage nodes storing EC blocks corresponding to the to-be-read data.

The obtaining unit 802 is further configured to read, from the determined list of storage nodes, the EC blocks corresponding to the to-be-read data.

Before the first sending unit 801 requests the management server to assign the data unit for the to-be-written data, the obtaining unit 802 is further configured to obtain an identifier of a third data unit that is returned by the management server;

the first sending unit 801 is further configured to write EC blocks generated based on the to-be-written data to storage nodes included in a third partition in which the third data unit is located; and when a write failure occurs, the first sending unit 801 requests the management server to reassign a data unit.

Figure 9:
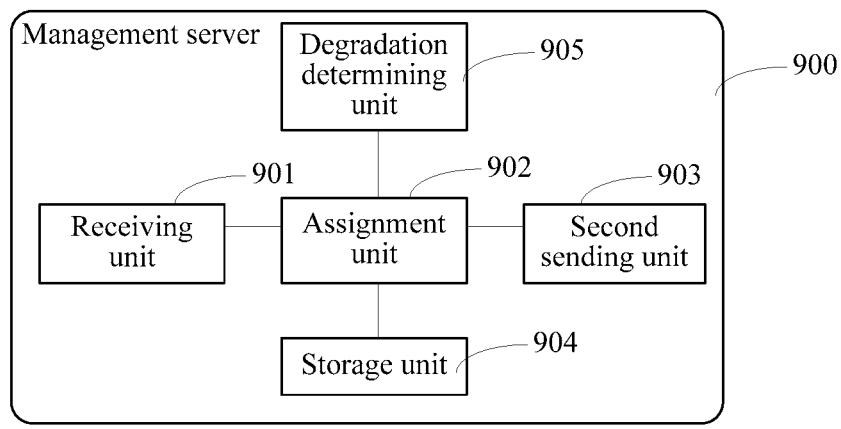
FIG. 9 is a schematic structural diagram of a management server according to an embodiment of the present invention.

FIG. 9 is a schematic structural diagram of a management server 900 according to an embodiment of the present invention. The management server 900 is the management server in the foregoing embodiments and performs a function of the management server in the foregoing embodiments.

The management server 900 includes:

a receiving unit 901, configured to receive a request that is sent by a storage client and that is used to assign a data unit for to-be-written data;

an assignment unit 902, configured to assign a first data unit for the to-be-written data in a first partition; and a second sending unit 903, configured to return an identifier of the first data unit, a status of the first data unit, and a first partition view of the first partition to the storage client, where the status of the first data unit indicates storage nodes that the storage client is allowed to use in the first partition, the first partition view indicates a list of storage nodes included in the first partition, and a quantity of the storage nodes that the storage client is allowed to use is less than N+M.

The management server 900 further includes a storage unit 904, configured to record the status of the first data unit.

There is a faulty node in the first partition, the storage nodes that the storage client is allowed to use are non-faulty nodes in the first partition, and the status of the first data unit indicates states of storage nodes included in the first partition when the management server creates the first data unit.

The second sending unit 903 is further configured to: when the storage client performs a read operation, return a status of a second data unit corresponding to to-be-read data, and a second partition view and a second partition status of a second partition to the storage client, where the second data unit is located in the second partition, the status of the second data unit indicates storage nodes that the storage client is allowed to use in the second partition when the management server creates the second data unit, and the second partition status indicates whether storage nodes included in the second partition are faulty currently.

Before the storage client requests the management server 900 to assign the data unit for the to-be-written data, the second sending unit 903 is further configured to return an identifier of a third data unit to the storage client.

The receiving unit 901 is further configured to: when the storage client fails to write EC blocks generated based on the to-be-written data to storage nodes included in a third partition in which the third data unit is located, receive a request that is sent by the storage client and that is used to reassign a data unit.

The management server 900 further includes a degradation determining unit 905, configured to: determine, based on a quantity of partitions having a faulty node, whether partition degradation is allowed, and if partition degradation is allowed, assign the first data unit for the to-be-written data in the first partition.

The degradation determining unit 905 is specifically configured to: determine whether a ratio of the quantity of the partitions having a faulty node to a total quantity of partitions is greater than a preset percentage, and if the ratio is greater than the preset percentage, determine that partition degradation is allowed.

The assignment unit 902 is further configured to: when the degradation determining unit determines that partition degradation is not allowed, assign the third data unit for the to-be-written data in the third partition having no faulty node, and return an identifier of the third data unit to the storage client.

Figure 10:
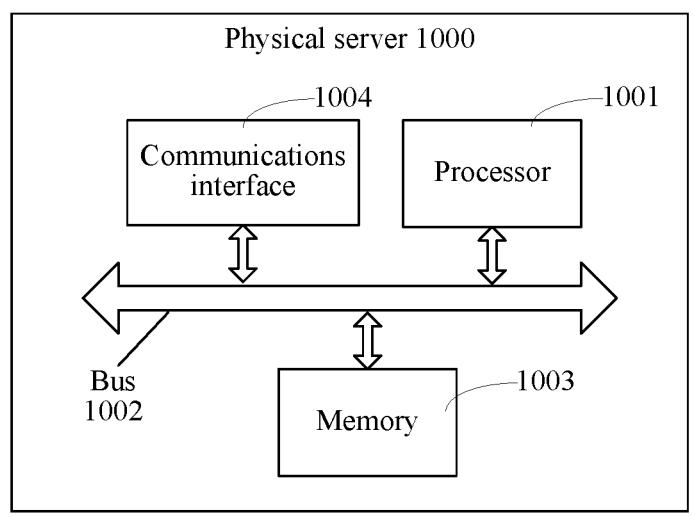
FIG. 10 is a schematic structural diagram of a physical server according to an embodiment of the present invention.

The storage client and the management server may be general-purpose computer devices. For example, FIG. 10 is a schematic diagram of a hardware structure of a physical server 1000 according to an embodiment of the present invention. The physical server performs a function of the foregoing storage client or management server. The physical server 1000 includes at least one processor 1001, a communications bus 1002, a memory 1003, and at least one communications interface 1004.

The processor 1001 may be a general-purpose central processing unit (CPU), a microprocessor, an application-specific integrated circuit (ASIC), or one or more integrated circuits configured to control program execution of solutions of the present invention.

The communications bus 1002 may include a path and transfer information between the foregoing components. The communications interface 1004 is configured to communicate with another device or communications network, for example, an Ethernet, a radio access network (RAN), or a wireless local area network (LAN) by using any apparatus similar to a transceiver.

The memory 1003 may be a read-only memory (ROM) or another type of static storage device capable of storing static information and instructions, or a random access memory (RAM) or another type of dynamic storage device capable of storing information and instructions; or may be an electrically erasable programmable read-only memory (EEPROM), a compact disc read-only memory (D-ROM) or another compact disc storage, an optical disc storage (including a compact disc, a laser disc, an optical disc, a digital versatile disc, a Blu-ray disc, or the like), a storage medium or another magnetic storage device of a storage node, or any other medium that can be used to carry or store desired program code having a form of an instruction or data structure and that can be accessed by a computer; but the memory 1003 is not limited thereto. The memory 1003 may exist independently and is connected to the processor by using the bus. Alternatively, the memory may be integrated with the processor.

The memory 1003 is configured to store program code for executing the solutions of the present invention, and the processor 1001 controls execution of the program code. The processor 1001 is configured to execute the program code stored in the memory 1003, to implement the function of the foregoing storage client or management server.

A computer program instruction in this embodiment of the present invention may be stored in a computer readable memory that can guide a computer or another programmable data processing device to work in a particular manner, and functions of parts in the foregoing embodiments may be implemented by executing the computer program instruction.

It should be noted that, in the claims and the specification, words such as first, second, third, and fourth are added merely for ease of description, and mainly for descriptive differentiation between similar names. These words have no specific meaning, and do not indicate a difference in an aspect such as time sequence, degree, or importance. For example, a "first partition" in the claims may be the same as or different from a "first partition" in the specification, and "first partitions" in different embodiments of the specification may be the same or different.

Finally, it should be noted that the foregoing embodiments are merely intended for describing but not for limiting the technical solutions of the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions in the embodiments of the present invention.

What is claimed is:

1. A data storage system, wherein the data storage system comprises:
   a storage client; and
   a distributed storage system, wherein the distributed storage system uses an erasure coding (EC) technology to store data and, the distributed storage system comprises:
   a management server; and
   a plurality of storage nodes, wherein:
      the plurality of storage nodes comprise N storage nodes and M storage nodes;
      the N storage nodes and the M storage nodes comprise a storage node group corresponding to one partition;
      the N storage nodes are configured to store data blocks;
      the M storage nodes are configured to store parity blocks generated based on the data blocks; and
      N and M are positive integers greater than 2; and
   wherein:
      the storage client is configured to request the management server to assign a data unit for to-be-written data;
      the management server is configured to:
         assign a first data unit for the to-be-written data in a first partition, and
         return an identifier of the first data unit and a status of the first data unit to the storage client, wherein:
            the status of the first data unit indicates storage nodes the storage client is allowed to use in the first partition; and
            a quantity of the storage nodes that the storage client is allowed to use is less than N+M,
            wherein the storage nodes that the storage client is allowed to use in the first partition comprise non-faulty nodes; and
      the storage client is further configured to:
         obtain the identifier of the first data unit, the status of the first data unit, and a first partition view of the first partition, wherein the first partition view indicates a list of storage nodes comprised in the first partition;
         determine, based on the status of the first data unit, quantities of data blocks and parity blocks that need to be generated, and perform EC coding on the to-be-written data, to generate data blocks and parity blocks corresponding to the to-be-written data, wherein a sum of quantities of the generated data blocks and parity blocks is equal to the quantity of the storage nodes the storage client is allowed to use; and
         store, based on the first partition view and the status of the first data unit, the generated data blocks and parity blocks into the storage nodes the storage client is allowed to use in the first partition, wherein each node stores one data block or parity block.

2. The system according to claim 1, wherein the management server is further configured to record the status of the first data unit.

3. The system according to claim 1, wherein:
   the storage client is further configured:
      to perform a read operation to obtain a status of a second data unit corresponding to to-be-read data, and a second partition view and a second partition status of a second partition in which the second data unit is located, wherein the status of the second data unit indicates storage nodes the storage client is allowed to use in the second partition when the management server creates the second data unit, and the second partition status indicates whether storage nodes comprised in the second partition are faulty currently; and the storage client is further configured to:
determine, based on the status of the second data unit, the second partition view, and the second partition status, a list of normal storage nodes storing EC blocks corresponding to the to-be-read data; and
read, from the determined list of storage nodes, the EC blocks corresponding to the to-be-read data.

4. The system according to claim 1, wherein before the storage client requests the management server to assign the data unit for the to-be-written data, the storage client is further configured to:
write, based on an identifier of a third data unit returned by the management server, EC blocks generated based on the to-be-written data to storage nodes comprised in a third partition in which the third data unit is located; and
when a write failure occurs, request the management server to reassign a data unit.

5. The system according to claim 1, wherein
there is a faulty node in the first partition, the storage nodes that the storage client is allowed to use are non-faulty nodes in the first partition, and the status of the first data unit indicates states of storage nodes comprised in the first partition when the management server creates the first data unit; or
the storage nodes that the storage client is allowed to use are storage nodes that are designated in the first partition by the management server for the storage client and that store the to-be-written data.

6. The system according to claim 1, wherein
a quantity of the generated parity blocks is equal to M, and a quantity of the generated data blocks is equal to a value obtained by subtracting M from the quantity of the storage nodes the storage client is allowed to use.

7. The system according to claim 1, wherein the management server is further configured to:
determine, based on a quantity of partitions having a faulty node, whether partition degradation is allowed; and
assign the first data unit for the to-be-written data in the first partition when partition degradation is allowed.

8. The system according to claim 7, wherein the management server is configured to:
determine whether a ratio of the quantity of the partitions having a faulty node to a total quantity of partitions is greater than a preset percentage; and
determine that partition degradation is allowed when the ratio is greater than the preset percentage.

9. The system according to claim 7, wherein the management server is further configured to:
assign a fourth data unit for the to-be-written data in a fourth partition having no faulty node when partition degradation is not allowed; and
return an identifier of the fourth data unit to the storage client.

10. A storage client, wherein the storage client uses an erasure coding (EC) technology to store data into a distributed storage system, wherein the distributed storage system comprises:
a management server; and
a plurality of storage nodes, wherein:
the plurality of storage nodes comprises N storage nodes and M storage nodes;
the N storage nodes and the M storage nodes comprise a storage node group corresponding to one partition;
the N storage nodes are configured to store data blocks;
the M storage nodes are configured to store parity blocks generated based on the data blocks; and
N and M are positive integers greater than 2; and
wherein the storage client comprises an interface and a processor, and the interface communicates with the processor wherein the processor is configured to:
request the management server to assign a data unit for to-be-written data;
obtain an identifier of a first data unit, a status of the first data unit, and a first partition view of a first partition that are returned by the management server, wherein:
the first data unit is located in the first partition,
the first partition view indicates a list of storage nodes comprised in the first partition,
the status of the first data unit indicates storage nodes the storage client is allowed to use in the first partition, and
a quantity of the storage nodes that the storage client is allowed to use is less than N+M,
wherein the storage nodes that the storage client is allowed to use in the first partition comprise non-faulty nodes; and
determine, based on the status of the first data unit, quantities of data blocks and parity blocks that need to be generated, and perform EC coding on the to-be-written data, to generate data blocks and parity blocks corresponding to the to-be-written data, wherein a sum of quantities of the generated data blocks and parity blocks is equal to the quantity of the storage nodes that the storage client is allowed to use; and
store, based on the first partition view and the status of the first data unit, the generated data blocks and parity blocks into the storage nodes that the storage client is allowed to use in the first partition, wherein each node stores one data block or parity block.

11. The storage client according to claim 10, wherein the processor is further configured to:
obtain a status of a second data unit corresponding to to-be-read data, and a second partition view and a second partition status of a second partition in which the second data unit is located when the storage client performs a read operation, wherein the status of the second data unit indicates storage nodes the storage client is allowed to use in the second partition when the management server creates the second data unit, and the second partition status indicates whether storage nodes comprised in the second partition are faulty currently;
determine, based on the status of the second data unit, the second partition view, and the second partition status, a list of normal storage nodes storing EC blocks corresponding to the to-be-read data; and
read, from the determined list of storage nodes, the EC blocks corresponding to the to-be-read data.

12. The storage client according to claim 10, wherein the processor is further configured to:
obtain an identifier of a third data unit that is returned by the management server;
write EC blocks generated based on the to-be-written data to storage nodes comprised in a third partition in which the third data unit is located; and request the management server to reassign a data unit when a write failure occurs.

13. A management server in a distributed storage system, wherein:
the distributed storage system uses an erasure coding (EC) technology to store data and the distributed storage system further comprises:
a plurality of storage nodes, wherein:
the plurality storage nodes comprises N storage nodes and M storage nodes; the N storage nodes and the M storage nodes comprise a storage node group corresponding to one partition;
the N storage nodes are configured to store data blocks;
the M storage nodes are configured to store parity blocks generated based on the data blocks; and
N and M are positive integers greater than 2; and
the management server comprises an interface and a processor, wherein the interface communicates with the processor and the processor is configured to:
receive a request that is sent by a storage client and that is used to assign a data unit for to-be-written data;
assign a first data unit for the to-be-written data in a first partition; and
return an identifier of the first data unit, a status of the first data unit, and a first partition view of the first partition to the storage client, wherein:
the status of the first data unit indicates storage nodes the storage client is allowed to use in the first partition,
the first partition view indicates a list of storage nodes comprised in the first partition, and
a quantity of the storage nodes the storage client is allowed to use is less than N+M, wherein the storage nodes that the storage client is allowed to use in the first partition comprise non-faulty nodes.

14. The management server according to claim 13, wherein the processor is further configured to:
record the status of the first data unit.

15. The management server according to claim 14, wherein there is a faulty node in the first partition, the storage nodes that the storage client is allowed to use are non-faulty nodes in the first partition, and the status of the first data unit indicates states of storage nodes comprised in the first partition when the management server creates the first data unit.

16. The management server according to claim 13, wherein the processor is further configured to:
return a status of a second data unit corresponding to to-be-read data, and a second partition view and a second partition status of a second partition to the storage client when the storage client performs a read operation, wherein the second data unit is located in the second partition, the status of the second data unit indicates storage nodes that the storage client is allowed to use in the second partition when the management server creates the second data unit, and the second partition status indicates whether storage nodes comprised in the second partition are faulty currently.

17. The management server according to claim 13, wherein the processor is further configured to:
return an identifier of a third data unit to the storage client; and
receive a request that is sent by the storage client and that is used to reassign a data unit when the storage client fails to write EC blocks generated based on the to-be-written data to storage nodes comprised in a third partition in which the third data unit is located.

18. The management server according to claim 13, further the processor is further configured to:
determine, based on a quantity of partitions having a faulty node, whether partition degradation is allowed, and assign the first data unit for the to-be-written data in the first partition when partition degradation is allowed.

19. The management server according to claim 18, wherein the processor is further configured to:
determine whether a ratio of the quantity of the partitions having a faulty node to a total quantity of partitions is greater than a preset percentage, and determine that partition degradation is allowed when the ratio is greater than the preset percentage.

20. The management server according to claim 18, wherein the processor is further configured to:
assign a fourth data unit to the to-be-written data in a fourth partition having no faulty node; and
return an identifier of the fourth data unit to the storage client when the degradation determining unit determines that partition degradation is not allowed.

21. A data storage method in a distributed storage system, wherein the distributed storage system uses an erasure coding (EC) technology to store data and the distributed storage system comprises:
a management servers; and
a plurality of storage nodes, wherein:
the plurality of storage nodes comprise N storage nodes and M storage nodes;
the N storage nodes and the M storage nodes comprise a storage node group corresponding to one partition;
the N storage nodes are configured to store data blocks;
the M storage nodes are configured to store parity blocks generated based on the data blocks; and
N and M are positive integers greater than 2; and
wherein the method comprises:
requesting, by a storage client, the management server to assign a data unit for to-be-written data;
assigning, by the management server, a first data unit for the to-be-written data in a first partition, and
returning, by the management server, an identifier of the first data unit and a status of the first data unit to the storage client, wherein:
the status of the first data unit indicates storage nodes the storage client is allowed to use in the first partition, and
a quantity of the storage nodes the storage client is allowed to use is less than N+M, wherein the storage nodes that the storage client is allowed to use in the first partition comprise non-faulty nodes;
obtaining, by the storage client, the identifier of the first data unit, the status of the first data unit, and a first partition view of the first partition, wherein the first partition view indicates a list of storage nodes comprised in the first partition;
determining, by the storage client based on the status of the first data unit, quantities of data blocks and parity blocks that need to be generated, and performing EC coding on the to-be-written data, to generate data blocks and parity blocks corresponding to the to-be-written data, wherein a sum of quantities of the generated data blocks and parity blocks is equal to the quantity of the storage nodes that the storage client is allowed to use; and storing, by the storage client based on the first partition view and the status of the first data unit, the generated data blocks and parity blocks into the storage nodes that the storage client is allowed to use in the first partition, wherein each node stores one data block or parity block.

22. The method according to claim 21, after the assigning, by the management server, a first data unit, further comprising:

recording, by the management server, the status of the first data unit.

23. The method according to claim 21, further comprising:

performing, by the storage client, a read operation, to obtain a status of a second data unit corresponding to to-be-read data, and a second partition view and a second partition status of a second partition in which the second data unit is located, wherein the status of the second data unit indicates storage nodes the storage client is allowed to use in the second partition when the management server creates the second data unit, and the second partition status indicates whether storage nodes comprised in the second partition are faulty currently;

determining, by the storage client based on the status of the second data unit, the second partition view, and the second partition status, a list of normal storage nodes storing EC blocks corresponding to the to-be-read data; and reading, by the storage client from the determined list of storage nodes, the EC blocks corresponding to the to-be-read data.

24. The method according to claim 21, wherein before the assigning, by the management server, a first data unit, the method further comprises:

determining, by the management server based on a quantity of partitions having a faulty node, whether partition degradation is allowed, and assigning the first data unit for the to-be-written data in the first partition when partition degradation is allowed.

* * * * *